United States Patent [19]

Wexler

[11] Patent Number: 4,559,745
[45] Date of Patent: Dec. 24, 1985

[54] DEVICES FOR THE FIRE STOPPING OF PLASTICS PIPES

[75] Inventor: Jonathan B. Wexler, East Brighton, Australia

[73] Assignee: Fire Research Pty. Limited, Notting Hill, Australia

[21] Appl. No.: 635,792

[22] Filed: Jul. 30, 1984

[30] Foreign Application Priority Data

Jan. 19, 1984 [AU] Australia ............................. PG3267

[51] Int. Cl.⁴ ............................................. E04H 9/00
[52] U.S. Cl. ............................................ 52/1; 52/232; 52/317; 138/103
[58] Field of Search ............... 52/232, 1, 220, 221, 52/317; 138/103, 89; 49/5, 7; 137/72; 169/57

[56] References Cited

U.S. PATENT DOCUMENTS

| | | | |
|---|---|---|---|
| 3,462,890 | 8/1969 | Blumenkrantz et al. | 52/1 |
| 3,678,634 | 7/1972 | Wise et al. | 52/1 |
| 3,726,050 | 4/1973 | Wise et al. | 52/1 |
| 3,823,745 | 7/1974 | Schafenacker, Jr. | 138/103 |
| 3,864,883 | 2/1975 | McMartin | 52/232 |
| 4,109,423 | 8/1978 | Perrain | 52/1 |
| 4,136,707 | 1/1979 | Gaillot et al. | 52/1 |
| 4,221,092 | 9/1980 | Johnson | 52/232 |
| 4,307,546 | 12/1981 | Dolder | 52/1 |
| 4,424,867 | 1/1984 | Mallow | 52/221 |
| 4,493,173 | 1/1985 | Rohaut | 52/1 |

FOREIGN PATENT DOCUMENTS

| | | |
|---|---|---|
| 0062298 | 3/1982 | European Pat. Off. . |
| 93263 | 11/1983 | European Pat. Off. ............... 52/317 |
| 1249023 | 7/1965 | Fed. Rep. of Germany . |
| 2052683 | 5/1972 | Fed. Rep. of Germany ........ 52/232 |
| 2162251 | 6/1973 | Fed. Rep. of Germany ........ 52/232 |
| 2639647 | 3/1978 | Fed. Rep. of Germany ........ 52/232 |
| 2809463 | 4/1978 | Fed. Rep. of Germany . |
| 3004201 | 2/1980 | Fed. Rep. of Germany . |
| 3218573 | 10/1983 | Fed. Rep. of Germany ............ 52/1 |
| 2235328 | 11/1973 | France . |
| 2363673 | 8/1976 | France . |
| 2465041 | 11/1979 | France . |
| 636667 | 6/1983 | Switzerland .......................... 52/232 |

*Primary Examiner*—Henry E. Raduazo
*Assistant Examiner*—Caroline Dennison
*Attorney, Agent, or Firm*—Wolf, Greenfield & Sacks

[57] ABSTRACT

A device for shutting-off a plastics pipe in the event of a fire comprises a sheath of a flexible refractory fabric around a portion of the pipe within or adjacent a fire-resisting partition such as a wall or floor. A spring is placed under tension around the fabric and acts to radially constrict the pipe and sheath, when the pipe softens in the event of a fire. Upon subsequent burning, the burnt plastics forms a foam-like carbon mass which plugs the constricted sheath.

11 Claims, 7 Drawing Figures

DEVICES FOR THE FIRE STOPPING OF PLASTICS PIPES

BACKGROUND OF THE INVENTION

1. Field of the Invention

The present invention relates to devices for the fire stopping of plastics pipes.

2. Description of the Prior Art

Plastics pipes which pass through fire-resisting walls or floors in a building represent a potential fire hazard. In the event of a fire, the plastics pipe is liable to melt thus creating a void through which hot gases may pass thereby spreading the fire to the space on the other side of the wall or floor. In order to avoid this effect, fire regulations may require that where a pipe passes through a fire-resisting wall or floor, means are provided for blocking a void which may be formed if the pipe should melt.

One previously proposed method of blocking a void which may be formed by a melting pipe involves the use of a mechanical shut-off device comprising a metal closure plate, usually actuated by gravity or a spring bias to displace the pipe as it softens and thereby cover the resulting hole in the wall or floor, the plate being attached to a bracket or other mounting assembly secured to the wall or floor adjacent the pipe. In addition to simply covering the hole, it is necessary that a shut-off device of this type should, after reaching the closed position, provide across the opening a seal of sufficient gas tightness that hot gases under pressure in the fire compartment should have a sufficiently low rate of passage through the now covered opening that temperature rise conditions outside the fire compartment do not exceed test standards, or alternatively, that no collapse due to heat softening of plastic pipework outside the fire compartment can occur.

The sealing tightness of such a device can be improved by application of a variety of chemical materials which intumesce on heating and expand to fill any cracks or gaps which may be left between the metal plate and the area around the hole. Selection of such intumescing materials must be made with care to ensure that they do not obstruct the movement of the plate and prevent a full mechanical closure from taking place. Relevant properties of such chemical intumescing materials are the temperature at which intumescence begins to occur and the stiffness or strength of the foam generated. In practice it is found that intumescent chemicals of the carbon char forming type are suitable, but unfortunately these materials have the characteristic of burning away at the higher temperatures encountered at later stages of the fire. The best of these materials would not exceed 30 minutes of effective sealing performance under fire conditions.

A further problem associated with the use of such purely mechanical shut-off devices is that for long duration fire performance—say in excess of 2 hours—the moving shut-off plate needs to be of heavily insulated construction so as to prevent transmission of unacceptable amounts of heat through the plate itself and thence through the opening which it covers. In practice, mechanical devices required for performance to a 2 or 3 Hour Rating require to be of bulky construction and are objectionable both from a cost and from a building installation point of view. For this reason there is a preference to use a device known as a fire stop collar which comprises an intumescent packing surrounding the pipe within the floor or wall, rather than on the surface of the floor or wall. Devices of this type are disclosed, for example in U.S. Pat. No. 4,221,092 and French Patent Specification No. 2,235,328.

However, with such fire stop collars, the rate at which they can operate to close a softened plastic pipe within a wall or floor is limited by the rate at which heat transmission can reach the packing through the face exposed to the fire. In floor installations, it is found that collars of appropriate design can function adequately for uPVC pipes in nominal diameter sizes from 32 mm up to 100 mm. Above 100 mm in size, the collar does not act to close the pipe quickly enough and needs to be supplemented by the use of a mechanical shut-off device of the type described above which acts to close off the pipe opening at the time when the pipe first softens.

A similar consideration applies to smaller sizes of pipe when connected to floor drains and wastes such as from showers, bathrooms, and urinals. In such configurations, when the pipe within the fire compartment burns through, hot gases are free to issue from the floor grating and can ignite any combustibles which may be present in those immediate areas. This condition is quite distinct from that in which the plastics pipe runs continuously through the opening in the wall or floor, because hot gases are contained within the pipe, the walls of which remain relatively cool for sufficient time into the fire period for the fire stop collar to become activated and close the opening. Test conditions for this floor waste configuration require that temperatures measured in the actual floor grating opening cannot exceed 180° C. rise above ambient at any time from the onset of fire conditions. A fire stop collar used alone cannot satisfy this requirement and it is necessary to supplement it by a mechanical cut-off device with immediate action upon softening of the pipe.

Mechanical shut-off devices of the type so far described tend to be at least as expensive as the fire stop collars, and there is an appreciable extra cost in fixing such devices in their mounting position on a wall or the soffit of a building floor. Moreover, the bulk of such a device can be a significant hindrance to the operations of the plumbing contractor.

A requirement exists for a low cost mechanical shut-off device which can be used in conjunction with fire stop collars and like devices.

SUMMARY OF THE INVENTION

According to the present invention, there is provided a shut-off device for shutting off a plastics pipe in the event of a fire, said device comprising a sheath of a flexible refractory fabric positioned around a portion of the pipe within or adjacent a fire-resisting partition, such as a wall or floor, and means for applying radially compressive force to the fabric and pipe whereby to radially constrict the pipe and sheath when the pipe softens in the event of a fire.

Preferably, the force-applying means comprises a tension coil spring under tension around the sheath.

BRIEF DESCRIPTION OF THE DRAWINGS

An embodiment of the invention will now be described, by way of example only, with reference to the accompanying drawings, in which.

DESCRIPTION OF THE PREFERRED EMBODIMENTS

Figure 1:
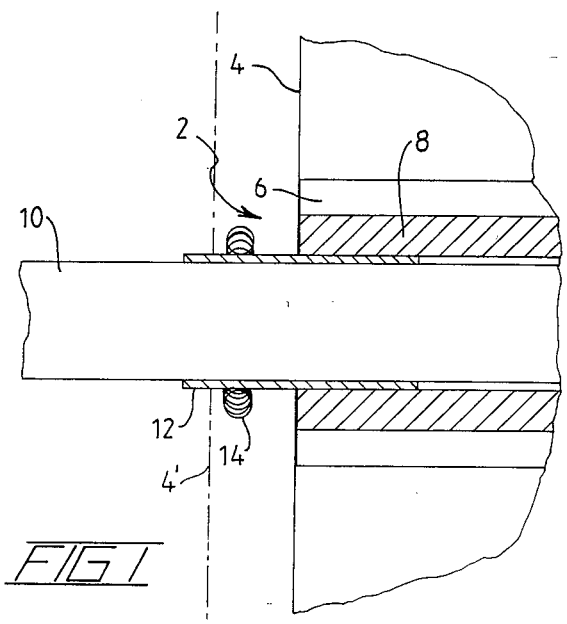
FIG. 1 is a section of a shut-off device of a preferred embodiment, in position on a plastics pipe.
Figure 2:
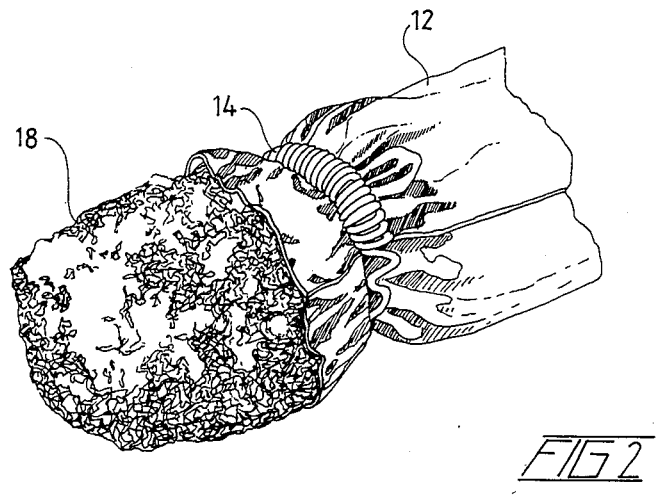
FIG. 2 shows, schematically, a foam-like carbon mass formed at the end of the shut-off device by a burnt pipe.

As shown in FIGS. 1 and 2, a shut-off device of the preferred embodiment of the invention is used in conjunction with a fire stop collar 2 embedded within a wall 4 or floor, the collar comprising a cylindrical casing 6 and an annular intumescent packing 8 which surrounds the plastics pipe 10. The shut-off device comprises a wrapping 12 of flexible refractory fabric which encircles the plastic pipe 10 over a length of approximately two pipe diameters. The fabric 12 which is preferably of less than 1 mm thickness and is composed of tightly woven silica, glass, or other refractory fibre, optionally coated for improved gas-tightness, is wrapped around the outside of the plastics pipe 10 in a single layer to form a sheath with quarter to half turn overlap, and positioned on the pipe so that the wrapping intrudes within the wall 4 or floor, and within the bore of the fire stop collar to a depth of approximately one pipe diameter, and protrudes beyond the surface of the wall 4 or floor by approximately one pipe diameter.

Over the protruding portion of fabric 12 there is placed a means which is operative to apply an inward radial force upon the wall of the pipe sufficient to bring about collapse of both the fabric sheath and the pipe wall when softening takes place in a fire. In its simplest, and preferred, form this force-applying means consists of an extended tension spring 14 placed circumferentially around the fabric 12 at a distance of approximately one pipe radius from the surface of the wall 4 or the soffit of the floor. The tension spring 14 is stretched around the pipe and its end loops interlocked to secure it in position.

In the event of a fire, the pipe softens and the portion of the pipe immediately surrounded by the spring 14 is radially contracted. The plastics material within the fabric sheath, and adjacent the outer end of the sheath, tends to burn and foam to form a foam-like carbon mass which blocks the outer end of the sheath and the constriction formed by the radially-contracted portion of the pipe. This is shown schematically in FIG. 2, the foam-like mass being indicated at 18 in FIG. 2. This foam-like mass, in effect, forms a plug which seals the pipe against ingress of hot gases past the constriction, at least for a time sufficient to permit proper activation of the fire stop collar.

The refractory fabric used in this device must be able to deform under external spring pressure without tearing or cracking under fire conditions at temperatures of up to 800° C. The fabric must also maintain an effective resistance to passage of hot gases for a sufficient time in the fire period,—for example, 10 to 20 minutes, depending upon the pipe diameter—to allow closure of the pipe opening to be effected by the intumescent packing in the fire stop collar.

The material from which the tension spring is formed should be such that it should be capable of maintaining requisite inward radial force on the walls of the pipe until softening and collapse is complete. This period ranges from about 5 minutes into the fire for the smaller pipe diameters, up to 10 minutes into the fire for the larger pipe diameters of 100 mm and above. Generally, ordinary low alloy spring steels would not maintain adequate spring temper sufficiently long into the fire to be reliable for service, and conventional stainless steels of the 18/8 type have been found satisfactory on smaller pipe sizes. For larger pipe diameters it may be desirable to employ high alloy, precipitation hardening spring steels capable of high temperature service to at least 600° C.

Figure 3:
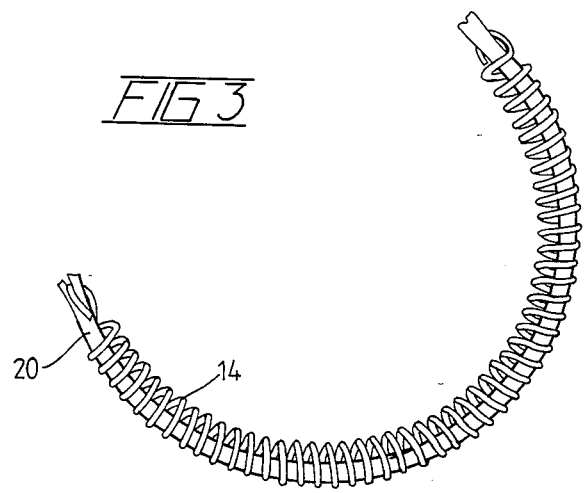
FIG. 3 is a perspective view of a spring of the device, prior to application to the device.

As will be apparent, when the spring is in position on the pipe, it needs to be under high tension in order to impart sufficient force to collapse the pipe when soft. It is envisaged that it could sometimes be difficult for a tradesman to stretch the spring sufficiently for application to the pipe, especially when working in a restricted space or when standing on a ladder. To facilitate application of the spring to the pipe, the spring 14 may be supplied pre-stretched on a semi-rigid former 20 as shown in FIG. 3. The former consists of a rod or tube which passes as a core through the spring, with each end of the spring being hooked into a slot of the corresponding end of the core. The core is of a material which possesses sufficient compressive strength to maintain the tensile force in the stretched spring, but which has sufficient resilience to enable the core, with the spring, to be bent around the pipe. A semi-rigid nylon rod or tube forms a suitable core for this purpose.

In order to apply the spring to a pipe, the spring 14, while on the core 20, is bent around the pipe and the two ends of the spring are hooked together. The core 20 is then cut to enable the spring to contract under its own tension onto the pipe. The core can then be removed.

Figure 6:
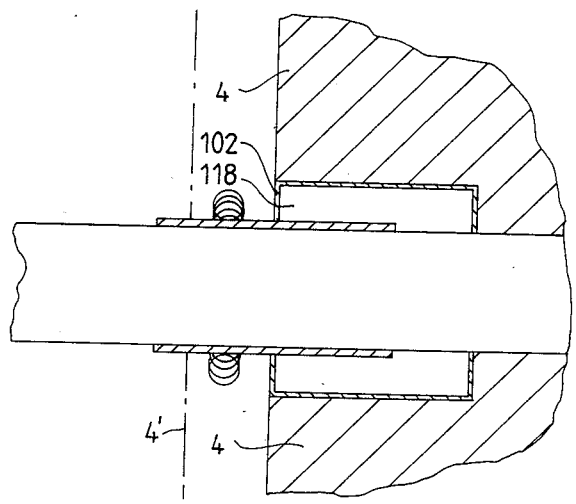
FIG. 6 is a section showing a fire stop system formed by the shut-off device of the invention and the fire stop collar of FIGS. 4 and 5.
Figure 4:
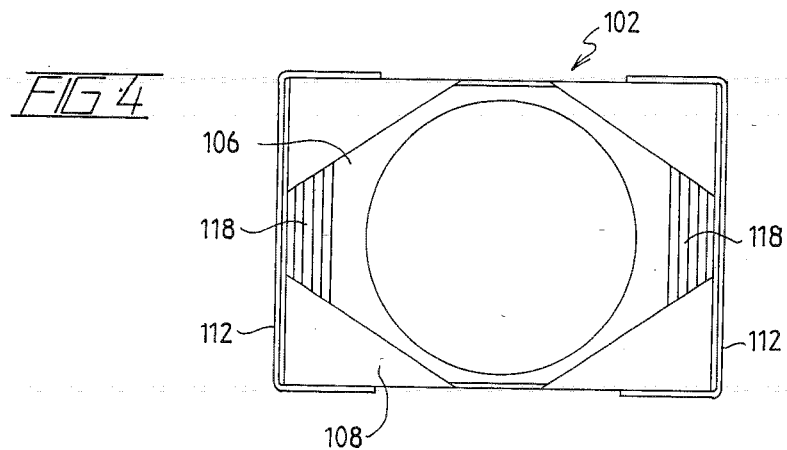
FIG. 4 is a front elevation of an improved design of fire stop collar with which the device of the invention can be used.
Figure 5:
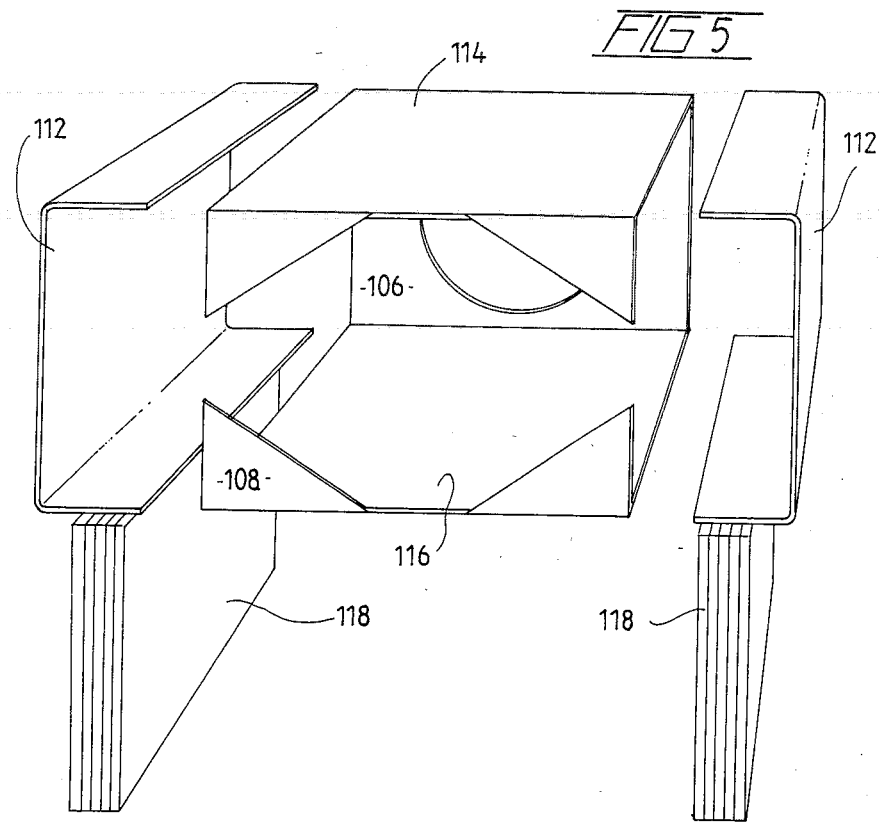
FIG. 5 is an exploded view of the fire stop collar of FIG. 4.

Although the shut-off device of the invention can be used in conjunction with any type of fire stop collar, a very effective fire stop system can be formed by use of the fire stop device in conjunction with a fire stop collar as shown in FIGS. 4 to 6, which also forms the subject of a co-pending patent application of the present applicant.

The fire stop collar shown in FIGS. 4 to 6 comprises an outer casing or canister 102 of rectangular parallelepiped outer form, preferably fabricated from sheet metal. Opposed faces 106, 108 of the casing 102 are provided with openings to permit the passage of a pipe. The opening in the face 106, which is the innermost face of the casing when installed, is circular and of a slightly larger diameter than the nominal diameter of the pipe with which the collar is to be used; alternatively the opening in this face may be of elliptical form. The opening in the opposing face 108, which is the outermost face of the casing when installed, is hexagonal, the longitudinal and transverse dimensions of this opening corresponding to the longitudinal dimensions of the face itself, whereby this opening is of relatively large area. When installed, the casing is embedded within the wall or floor through which the pipe passes.

The preferred construction of the casing will be understood from the exploded view of FIG. 5. The end walls, shown at 112, are spot welded to upper and lower walls 114, 116, and the outer face 108 is formed by triangular gussets bent inwardly from the outer edges of the upper and lower walls 114, 116 whereby to define the hexagonal opening. In an especially preferred embodiment, casings designed for use with pipes of outside diameter D have the following range of dimensions for nominal pipe diameters ranging from 32 mm to 150 mm.
Depth (the distance between the inner and outer faces): 0.5 D to 2.0 D
Height (the distance between the upper and lower walls): D+5 mm
Width (the distance between the end walls): 1.4 to 1.7 D The hexagonal opening permits passage of the pipe through the casing substantially perpendicularly to the inner and outer faces, or inclined to the inner and outer faces.

The casing 102 contains an intumescent packing in the form of two rectangular blocks 118, each positioned between a respective one of the end walls 112 and a pipe passing through the openings in the inner and outer faces 106, 108. Each block 118 is placed with one of its faces against the internal surface of the end wall 112, the dimensions of this face substantially corresponding to those of the end wall. The thickness of the blocks 118 (as considered in a direction at right angles to the end walls 112) is such that there is sufficient clearance between the blocks 118 and the pipe to permit such inclination of the pipe as is likely to be required in practice. Each block 118 advantageously comprises several rectangular sheets of reinforced hydrous sodium silicate (such as that manufactured by B.A.S.F. under the trade mark "Palusol") packed in face-to-face relation with the plane of each sheet extending perpendicularly to the inner and outer faces 106, 108 of the casing. Preferably the sheets of "Palusol" are interleaved with sheets of aluminium or other metal for example 0.1 mm in thickness. These sheets act to transfer heat quickly into the body of the pack and provide for more uniform expansion.

In the event of a fire, the blocks expand substantially in the direction of their thickness, that is perpendicularly to the end walls 112, with the result that the pipe is crushed between the two expanding blocks in a vice-like action, as the pipe softens. The time required to block the void formed by the melting pipe is less than the time required by cylindrical fire stop collars as previously proposed. This faster action is primarily achieved because, with a packing of annular shape, the radially-inwards expansion involves the expenditure of considerable force in order to provide the necessary distortion of shape. No such shape distortion is involved with the rectangular configuration because expansive motion occurs basically in a straight line and is opposed only the by the relatively small force required to collapse the softening plastics pipe.

The rectangular configuration has several further advantages over the cylindrical version.

Manufacture of the metal casing is cheaper and involves less investment in tooling. Manufacture of the "Palusol" packs requires only simple straight line cutting from stock sheets instead of heat treatment and spiral roll forming which is necessary to make the annular packing. In addition, cracking and crazing damage to the resinous coating incurred by the rolling operation is avoided. It is also cheaper and easier to achieve sealing of the rectangular packs against atmospheric ingress of carbon dioxide; a preferred method of protection is by shrink-wrapping the pack with plastics film, which is readily achieved when the shape is that of a rectangular block, but almost impossible to do effectively with an annular packing.

Where a split or bisected version is required for use with existing pipes, the design of the casing allows for very easy splitting and re-assembly on site by cutting through either the upper or lower wall with a pair of tin snips, bending the casing open by hand to permit insertion over a pipe, and subsequently bending it closed again.

The described design of the rectangular casing with two separated blocks of internal packing allows greater flexibility in manufacturing and transportation. For example, the casing can be fabricated and assembled at a sheet metal factory and then shipped to a regional assembly plant where the blocks of packing can be inserted subsequently. Insertion of the packing is effected via the hexagonal opening. This opening has a large open area which facilitates manipulation and positioning of the blocks within the assembled casing. Alternatively, the flat casing elements can be shipped in knock-down form and assembled by simple spot welding at a regional assembly plant. In contrast, cylindrically shaped collars generally need to have their final closure effected by some relatively sophisticated operation such as spinning or roll forming, making regional operations less convenient and more expensive.

It is to be noted that the opening in the outer face 108 of the casing extends across th entire width of the face with the result that part of the edge of each packing block 118 is exposed so as to permit direct exposure of the packing to the fire. This is of assistance in obtaining rapid heat transfer from the fire to the packing. In conventional cylindrical type devices, there is a retaining metal surface between the fire and the packing and this presents substantial resistance to heat transfer, by convection and radiation, to the packing.

Although in the embodiment described, the opening in the outer face of the casing is hexagonal, the advantages described above can, of course, be obtained with openings of other shape, for example elliptical openings. The hexagonal opening formed by inturned gussets from the upper and lower walls does, however, provide a relatively inexpensive construction.

As shown in FIGS. 1 and 6, the spring 14 is adjacent the fire-resisting partition, such as the wall 4 or a floor. When used with relatively thick partitions, such as thick walls or floors, the spring 14 may be positioned on a part of the pipe within the wall or fllor, for example as illustrated by the phantom line 4' in FIGS. 1 and 6.

Figure 7:
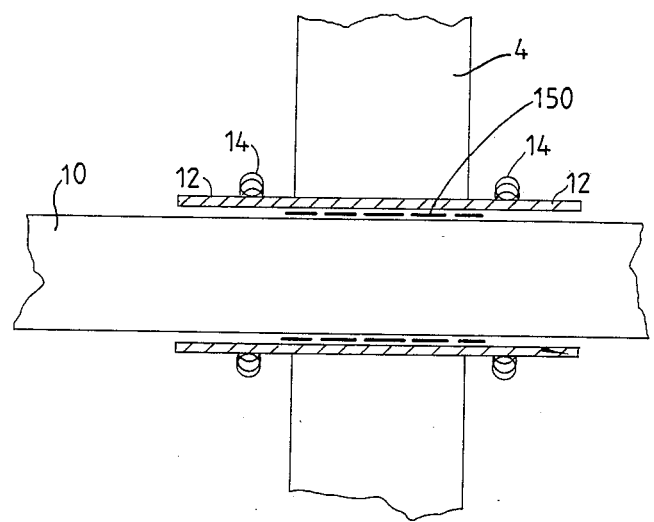
FIG. 7 is a section showing an arrangement wherein the shut-off device of the invention is used without a fire stop collar.

FIG. 7 shows the manner in which the shut-off device can be used other than in conjunction with a fire stop collar. In FIG. 7, a metal sleeve 150 is interposed between the pipe 10 and the refractory fabric 12. The sleeve 150 may be a preformed sleeve or be formed by a flexible metal sheet wrapped around the pipe. The sleeve 150 acts to prevent collapse of the structure formed by the foam-like carbon mass and the refractory fabric when the structure is subjected to the intense heat of a fire for a relatively long period of time. As will be apparent, with the arrangement shown in FIG. 7, if the structure were to collapse, a void would be formed through the wall. This effect would not occur when the shut-off device of the invention is used with a fire stop collar because, in that case, during the longer period of exposure to the fire, the fire stop collar would actuate and block the void which would otherwise exist. It is to be noted that the sleeve 150 is so positioned that the end of the sleeve lies inwardly with respect to the spring so that the presence of the sleeve does not prevent the contraction of the fabric sheath and pipe in the immediate zone of the spring.

In FIG. 7, the sleeve and the refractory fabric 12 extend the entire thickness of the wall 4 and a respective spring 14 is placed at each side of the wall 4. This arrangement will provide for shut-off in the event of a fire at either side of the wall, and will provide for protection when exposed to a fire for a relatively long period of time. However, for shorter protection only one spring may be required.

I claim:

1. In combination, a fire resisting partition having an opening therethrough, a plastics pipe passing through said partition via said opening, and a device for shutting off the pipe in the event of a fire, said device comprising a sheath of flexible refractory fabric positioned around a portion of the pipe within or adjacent said partition, and means for applying a radially compressive force to the sheath and pipe whereby to radially constrict the pipe and sheath when the pipe softens under the effect of heat.

2. The combination of claim 1, wherein said force applying means comprises a coil spring under tension around the sheath.

3. The combination of claim 2, wherein the fabric consists of a tightly woven refractory fibre.

4. The combination of claim 2, wherein the fabric is wrapped around the pipe whereby to form the sheath.

5. The combination of claim 2, further comprising a metal sleeve between the pipe and the sheath, the outer end of the sleeve lying axially inwardly of the spring with respect to the partition, said sleeve acting to prevent collapse of part of the length of the sheath in the event of exposure to fire.

6. The combination of claim 1, further comprising a fire stop device incorporated in said partition within said opening, said fire stop device comprising a casing through which said pipe passes, and intumescent packing within said casing, said intumescent packing, when exposed to heat, expanding within said casing to block said opening.

7. The combination of claim 6, wherein said sheath extends into said casing.

8. The combination of claim 6, wherein said casing is of generally rectangular parallelepipedic form with a pair of opposed faces formed with openings for the passage of the plastics pipe through the casing transversely to said faces, and said packing comprises two opposed blocks of intumescent material lying at opposite sides of said pipe passing through the casing.

9. The combination of claim 8, wherein each of the blocks comprises a stack of sheets comprising reinforced hydrous sodium silicate, the sheets being arranged in face-to-face relation within the pack, with the plane of each sheet extending substantially perpendicularly to the opposed faces of the casing.

10. The combination of claim 1, further comprising a fire stop device incorporated in said partition within said opening, said fire stop device comprising an intumescent packing through which the pipe passes, said packing, when exposed to heat, expanding to block said opening.

11. The combination of claim 2, wherein said spring is a pre-tensioned spring supported on a semi-rigid core which maintains the spring under tension prior to application to the sheath, said core being cut when the spring is in position on the sheath whereby the tension of the spring draws the spring into tight engagement with the sheath and pipe.

* * * * *

UNITED STATES PATENT AND TRADEMARK OFFICE
CERTIFICATE OF CORRECTION

PATENT NO. : 4,559,745

DATED : December 24, 2985

INVENTOR(S) : Jonathan B. Wexler

It is certified that error appears in the above-identified patent and that said Letters Patent is hereby corrected as shown below:

Under the heading "Foreign Application Priority Data", the following priority document should have been cited:
-- December 22, 1983 [AU] Australia PG2958 --.

Signed and Sealed this

Eighth Day of July 1986

[SEAL]

Attest:

DONALD J. QUIGG

Attesting Officer

Commissioner of Patents and Trademarks